Figure 1:
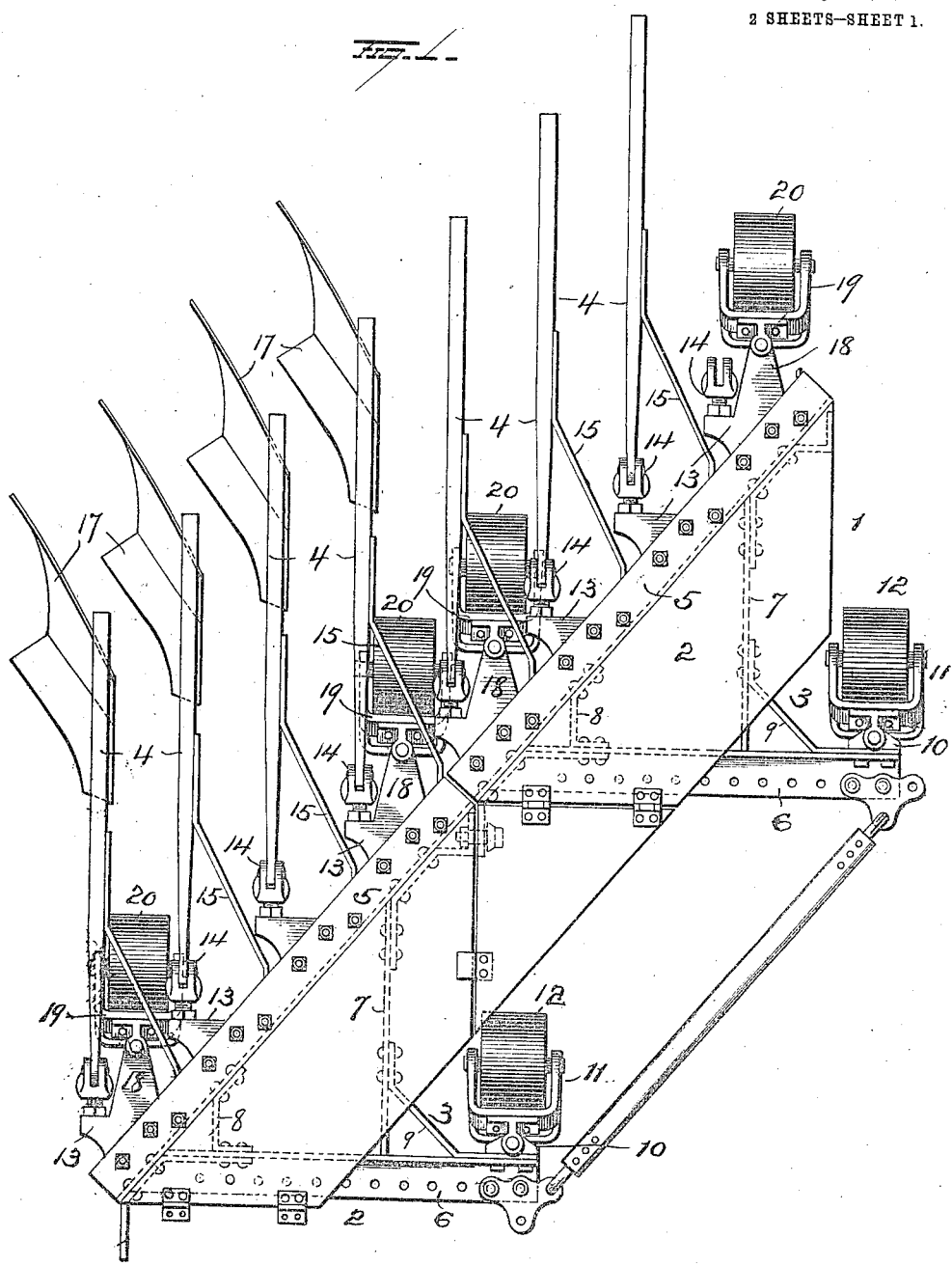

W. L. PAUL.
ENGINE GANG PLOW.
APPLICATION FILED JAN. 6, 1911.

1,034,404.

Patented July 30, 1912.
2 SHEETS—SHEET 1.

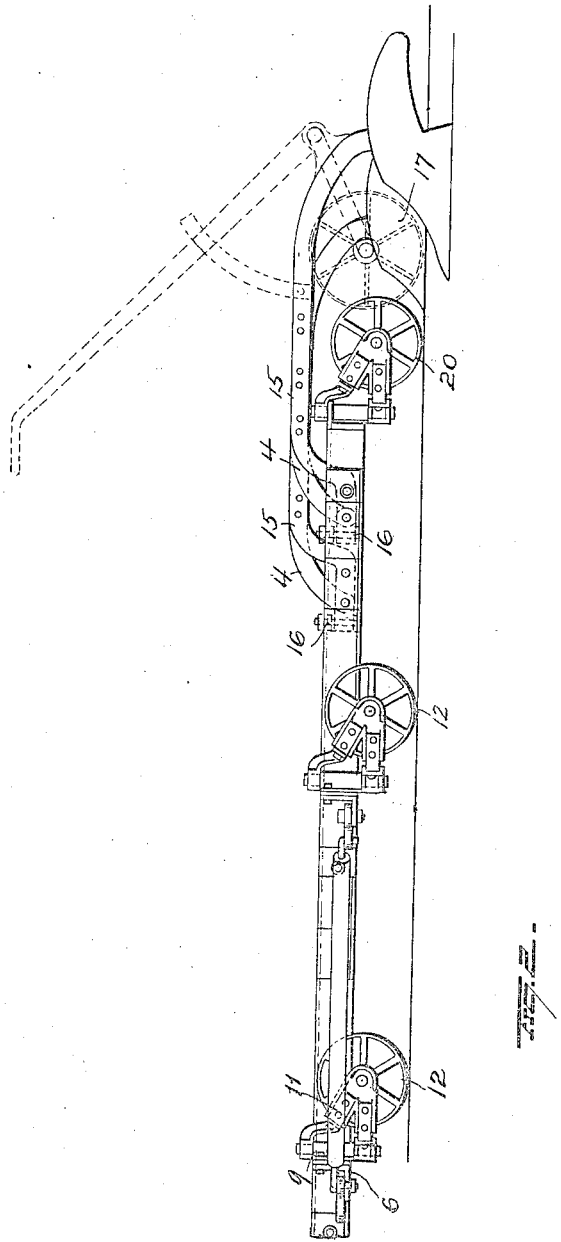

UNITED STATES PATENT OFFICE.

WILLIAM L. PAUL, OF SOUTH BEND, INDIANA, ASSIGNOR TO OLIVER CHILLED PLOW WORKS, OF SOUTH BEND, INDIANA.

ENGINE GANG-PLOW.

1,034,404.   Specification of Letters Patent.   Patented July 30, 1912.

Original application filed July 12, 1910, Serial No. 571,649. Divided and this application filed January 6, 1911. Serial No. 601,237.

*To all whom it may concern:*

Be it known that I, WILLIAM L. PAUL, of South Bend, in the county of St. Joseph and State of Indiana, have invented certain new and useful Improvements in Engine Gang-Plows; and I do hereby declare the following to be a full, clear, and exact description of the invention, such as will enable others skilled in the art to which it appertains to make and use the same.

This invention relates to improvements in plows and more particularly to that type known in the trade as engine gang plows,—this application being a division of application for patent filed by me on the 12th day of July 1910, and designated by Serial No. 571,649.

The object of my present invention is to so arrange gage wheels for the truck frame of a gang plow that they shall be disposed in rear of the pivoted support of the plow beams in a manner to gage the height of the front ends of the plow beams and thus enhance uniform plowing, and shorten the length of the structure.

With this object in view, the invention consists in certain novel features of construction and combinations of parts as hereinafter set forth and pointed out in the claims.

In the accompanying drawings, Figure 1 is a plan view of an engine gang plow embodying my improvements, and Fig. 2 is a side elevation, showing only two plow beams and coöperating devices.

My improved plow structure comprises a plurality of connected units, two of such units, 1 and 2 being shown in Fig. 1 of the drawing although it is apparent that any desired number of such units may be employed and each of said units is the same in construction.

Each unit comprises a truck frame or section 3 and a series of plows having their beams 4 connected with said truck frame. Each truck frame has a general triangular shape and comprises an angle iron member 5 to be disposed at an angle of 45 degrees more or less to the direction of travel of the plow; an angle iron member 6 secured at one end to the member 5 near the end of the latter and projecting laterally therefrom so as to be disposed at right angles to the direction of travel or line of draft of the machine, and an angle iron member 7 secured at one end to an intermediate portion of the member 6 and at its other end to the diagonal member 5 near the end thereof opposite to that to which the member 6 is secured. A brace 8 extends from the member 5 to the member 6 and a similar brace 9 extends from the free end of the member 6 to an intermediate point on the member 7. At the free end of the member 6 of the truck frame (which in effect constitutes the apex of the triangular truck frame) a bracket 10 is secured for the accommodation of the swiveled frame 11 of a truck wheel 12.

A series of rigid brackets 13, located at intervals on the diagonal member 5 of the truck frame unit, project rearwardly from said member 5 and to each of these brackets, a longitudinally adjustable knuckle 14 is secured and adapted for pivotal connection of a plow beam 4 therewith. Each plow beam 4 is disposed parallel with the line of travel of the machine and all of the plow beams are disposed parallel with each other but by reason of the diagonal disposition of the truck frame member 5, the connections of the beams with the truck frame are advanced progressively from one end of the series of plow beams to the other. A laterally projecting brace 15 is secured to an intermediate portion of each plow beam and at its forward end, each brace 15 is connected with the angle member 5 of the truck frame unit by means of a vertically adjustable knuckle 16.
A soil engaging member 17 is located at the rear end of each plow beam.

The end brackets 13 on each truck frame unit are provided with rearwardly projecting members 18 with which frames 19 are pivotally connected and these frames carry caster wheels 20. These caster wheels are thus located under the plane of the plow beams rearwardly of the pivotal connections of the adjacent plow beams with the truck frame unit and serve to gage the height of the forward ends of all the plow beams of the series and serve to give more uniform plowing than if said caster wheels were placed forwardly under the truck frame at some distance ahead of the point of the plow. Furthermore, by this construction the entire structure is shortened, and a saving in material is accomplished.

Having fully described my invention what I claim as new and desire to secure by Letters-Patent is,—

1. In an engine plow structure, a unit comprising a truck frame, plow beams pivotally connected at their forward ends with said truck frame, brackets projecting rearwardly from said truck frame adjacent to respective ends thereof, caster wheels having mountings in said brackets, and disposed under the planes of the plow beams rearwardly of the pivotal connection of the adjacent plow beam to the truck frame, and a wheel near the forward end of the truck frame.

2. A gang plow structure, comprising a plurality of triangular frames having their hypotenuses in alinement with each other, a plurality of plow beams pivotally connected at their forward ends with the diagonal rear end of each triangular frame, brackets projecting rearwardly from each triangular frame adjacent to respective ends of the diagonal rear end thereof, caster wheels having mountings in said brackets, and disposed under the planes of the plow beams rearwardly of the forward pivoted end of the adjacent plow beam, and a wheel near the apex of each triangular frame.

3. In a gang plow structure, a unit comprising a triangular frame having its hypotenuse disposed diagonal to the line of draft, plow beams pivotally connected at their forward ends with the diagonal portion of said frame, brackets projecting rearwardly from said frame adjacent to respective ends of the diagonal portion thereof, caster wheels having mountings in said brackets and disposed under the plane of the plow beams rearwardly of the pivoted forward ends of adjacent plow beams, and a trailing caster wheel connected with said frame adjacent to the apex thereof.

In testimony whereof, I have signed this specification in the presence of two subscribing witnesses.

WILLIAM L. PAUL.

Witnesses:
EDWIN NICAR,
THOMAS A. FREEMAN.